US009953207B2

(12) United States Patent
Fukuda

(10) Patent No.: US 9,953,207 B2
(45) Date of Patent: Apr. 24, 2018

(54) BIOMETRIC AUTHENTICATION DEVICE, BIOMETRIC AUTHENTICATION METHOD AND COMPUTER-READABLE NON-TRANSITORY MEDIUM

(71) Applicant: FUJITSU LIMITED, Kawasaki-shi, Kanagawa (JP)

(72) Inventor: Mitsuaki Fukuda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 15/254,808

(22) Filed: Sep. 1, 2016

(65) Prior Publication Data

US 2017/0068839 A1    Mar. 9, 2017

(30) Foreign Application Priority Data

Sep. 4, 2015    (JP) ................... 2015-175113

(51) Int. Cl.
*G07C 9/00* (2006.01)
*G06K 9/00* (2006.01)
(Continued)

(52) U.S. Cl.
CPC ..... *G06K 9/00087* (2013.01); *G06K 9/00067* (2013.01); *G06K 9/00382* (2013.01);
(Continued)

(58) Field of Classification Search
USPC ....................................... 382/115
See application file for complete search history.

(56) References Cited

U.S. PATENT DOCUMENTS 9,672,406 B2 * 6/2017 Hatcher, II ......... G06K 9/00033
9,710,632 B2 * 7/2017 Lymberopoulos ...... G06F 21/32
(Continued)

FOREIGN PATENT DOCUMENTS

EP          2660773 A1    11/2013
JP       2013-218535       10/2013
(Continued)

OTHER PUBLICATIONS

EESR—The Extended European Search Report of European Patent Application No. 16186293.3 dated Jan. 26, 2017.

*Primary Examiner* — Jerome Grant, II
(74) *Attorney, Agent, or Firm* — Fujitsu Patent Center

(57) ABSTRACT

A biometric authentication device performing an authentication based on a similarity between a biometric image that is an object of comparing and an enrolled biometric image, includes: a storage configured to store a plurality of model images generated by changing a bending angle of a joint of a biometric model and correction information of each of the plurality of model images; a biometric sensor configured to capture a biometric image that is an object of comparing; and a processor configured to execute a process, the process including: determining similarities between the biometric image captured by the biometric sensor and the plurality of model images; selecting a model image based on the similarities; reading correction information corresponding to the model image that is selected, from the storage; and correcting one of the biometric image captured by the biometric sensor or the enrolled biometric image based on the correction information.

18 Claims, 13 Drawing Sheets

(51) Int. Cl.
   *G06K 9/62* (2006.01)
   *G06T 7/73* (2017.01)
   *G06F 21/32* (2013.01)
   *G06T 9/00* (2006.01)

(52) U.S. Cl.
   CPC ....... *G06K 9/00389* (2013.01); *G06K 9/6215* (2013.01); *G06T 7/74* (2017.01); *G06F 21/32* (2013.01); *G06K 2009/00932* (2013.01); *G06T 9/001* (2013.01)

(56) References Cited

U.S. PATENT DOCUMENTS

| | | | | |
|---|---|---|---|---|
| 2005/0232471 A1* | 10/2005 | Baer | ................ | G06K 9/00006 382/115 |
| 2010/0165090 A1 | 7/2010 | Sweeney et al. | | |
| 2013/0027184 A1* | 1/2013 | Endoh | ................ | G06K 9/00013 340/5.83 |
| 2014/0196131 A1* | 7/2014 | Lee | ................ | G06F 21/35 726/7 |
| 2014/0212008 A1* | 7/2014 | Hatcher, II | ........ | G06K 9/00033 382/124 |
| 2015/0010215 A1* | 1/2015 | Fukuda | ............ | G06K 9/00013 382/115 |
| 2015/0193669 A1* | 7/2015 | Gu | .......................... | G06K 9/46 348/77 |
| 2015/0310673 A1 | 10/2015 | Romdahni | | |
| 2015/0334562 A1* | 11/2015 | Perold | ................... | H04W 12/04 713/171 |
| 2015/0366487 A1* | 12/2015 | Ryabov | ............... | A61B 5/1171 348/77 |
| 2016/0098550 A1* | 4/2016 | Lam | ....................... | G06F 21/32 726/18 |
| 2016/0180146 A1* | 6/2016 | Setterberg | .............. | G06F 3/044 382/124 |
| 2016/0275334 A1* | 9/2016 | Hama | ..................... | G06F 21/32 |
| 2017/0270289 A1* | 9/2017 | Lymberopoulos | ...... | G06F 21/32 |
| 2017/0325721 A1* | 11/2017 | Matsuda | ................ | A61B 5/117 |

FOREIGN PATENT DOCUMENTS

| | | | | |
|---|---|---|---|---|
| JP | 2017049955 A | * | 3/2017 | ............... G06T 7/00 |
| WO | 2014/079897 A1 | | 5/2014 | |

* cited by examiner

FIG. 1A
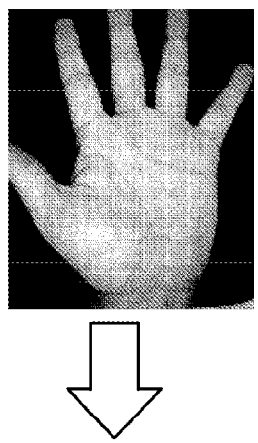
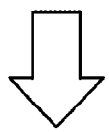
FIG. 1B
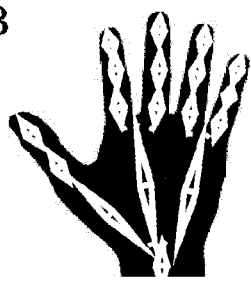
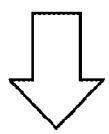
FIG. 1D
FIG. 1C
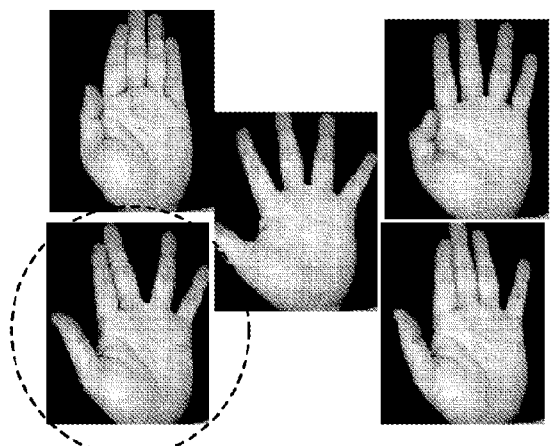
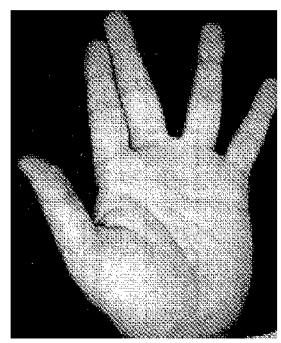
FIG. 1E
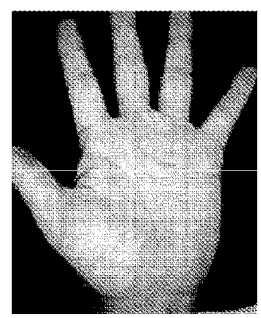

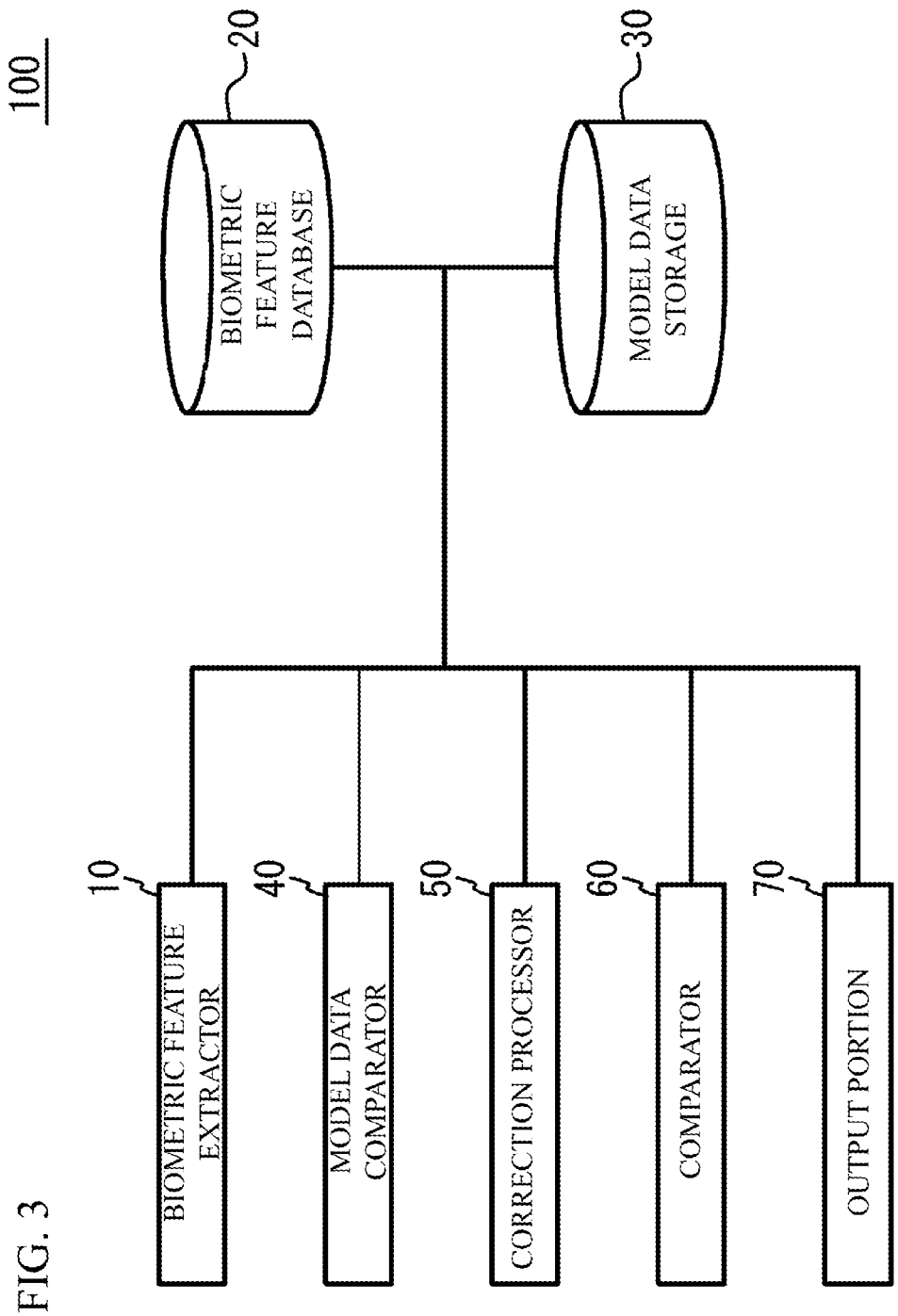

FIG. 7

| COMBINATION No. | THUMB | FOREFINGER | . . . |
|---|---|---|---|
| 1 | 0° | 0° | . . . |
| 2 | 5° | 0° | . . . |
| ⋮ | ⋮ | ⋮ | ⋮ |
| N | 90° | 90° | . . . |

FIG. 8A
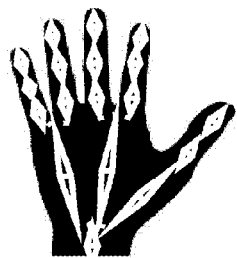
⇓
FIG. 8B
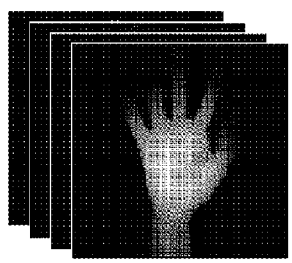
CAPTURE PALM IMAGE.
⇓
FIG. 8C
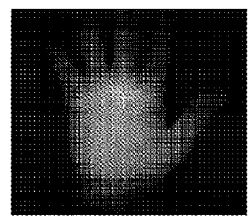
⇒ COMPARE OUTLINE OR CONTRASTING DENSITY. ⇐
⇓
DIGITALIZE SIMILARITY. SELECT IMAGE OF HIGH SCORE.
CORRECT BASED ON JOINT ANGLE OF ENROLLED IMAGE.
⇓
FIG. 8D
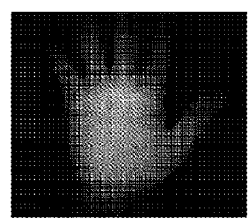
⇓
INVERSELY SUBTRACT JOINT ANGLE.
EXTRACT VEIN PATTERN.
FIG. 8F
ENROLLED BIOMETRIC IMAGE
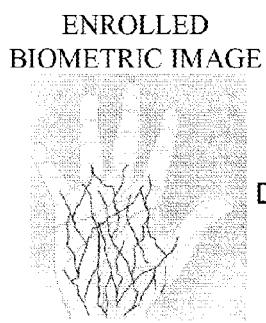
⇓
FIG. 8E ⇓
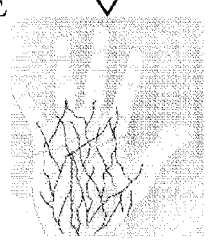
⇒ COMPARE VEIN PATTERNS. ⇐
⇓
RESULT

CAPTURE PALM IMAGE.

COMPARE OUTLINE OR CONTRASTING DENSITY.

DIGITALIZE SIMILARITY.
SELECT IMAGE OF HIGH SCORE.

EXTRACT VEIN PATTERN.

ENROLLED DATA

CORRECT BASED ON JOINT ANGLE OF ENROLLED IMAGE.

INVERSELY SUBTRACT JOINT ANGLE.

COMPARE VEIN PATTERNS.

RESULT

BIOMETRIC AUTHENTICATION DEVICE, BIOMETRIC AUTHENTICATION METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2015-175113, filed on Sep. 4, 2015, the entire contents of which are incorporated herein by reference.

FIELD

A certain aspect of embodiments described herein relates to a biometric authentication device, a biometric authentication method and a computer-readable non-transitory medium.

BACKGROUND

A biometric authentication technology performing an individual authentication with use of a biometric feature such as a fingerprint image, a vein image or a face image is widely spread, as a method of identifying a person with high accuracy. The biometric authentication technology can perform individual authentication with high accuracy.

SUMMARY

According to an aspect of the present invention, there is provided a biometric authentication device performing an authentication based on a similarity between a biometric image that is an object of comparing and an enrolled biometric image, including: a storage configured to store a plurality of model images generated by changing a bending angle of a joint of a biometric model and correction information of each of the plurality of model images; a biometric sensor configured to capture a biometric image that is an object of comparing; and a processor configured to execute a process, the process including: determining similarities between the biometric image captured by the biometric sensor and the plurality of model images; selecting a model image based on the similarities; reading correction information corresponding to the model image that is selected, from the storage; and correcting one of the biometric image captured by the biometric sensor or the enrolled biometric image based on the correction information.

BRIEF DESCRIPTION OF DRAWINGS

FIG. 1A to FIG. 1E schematically illustrate processes performed by a biometric authentication device in accordance with a first embodiment;

FIG. 3 illustrates a functional block of a biometric authentication device;

FIG. 7 illustrates a table of each generated combination information;

FIG. 8A illustrates an example of a three-dimensional model data;

FIG. 8B illustrates an example of two-dimensional simulation images of combinations of joint angles;

FIG. 8C illustrates an example of a palm image;

FIG. 8D illustrates an example of a corrected image;

FIG. 8E illustrates an extracted vein pattern;

FIG. 8F illustrates an example of an enrolled biometric feature;

DESCRIPTION OF EMBODIMENTS

In an individual authentication with use of a biometric feature, in a case where the individual authentication is actually performed, a biometric feature obtained at the time is compared with a biometric feature that is enrolled in advance. When a shape of a biometric instance deforms in accordance with a bending angle of a joint, the biometric feature changes according to the bending angle. Therefore, the shape during the enrolling process may be different from the shape during the authentication process. In this case, the comparing may be wrongly performed.

First Embodiment

FIG. 1A to FIG. 1E schematically illustrate processes performed by a biometric authentication device in accordance with a first embodiment. A palm is used as an example of a biometric instance. As illustrated in FIG. 1A, a standard biometric shape is generated by capturing images of palms of many people and averaging the images of the palms. Next, as illustrated in FIG. 1B, a three-dimensional model data is generated in advance for the purpose of simulating a shape of a palm, with use of the biometric shape of FIG. 1A. Next, as illustrated in FIG. 1C, two-dimensional simulation images are generated from the three-dimensional model data by variously changing angles of joints of fingers for deforming the three-dimensional model data.

FIG. 1D illustrates a palm image of a user captured by a biometric sensor. Next, a position of each two-dimensional simulation image of FIG. 1C is roughly adjusted to the palm image of FIG. 1D. Thus, positions, angles, sizes and average brightness values are roughly adjusted. After that, contrasting densities of the images are compared, and similarities of the contrasting densities are calculated. And, a two-dimensional simulation image of which contrasting density similarity is the highest is selected. In the example of FIG. 1C, a left lower two-dimensional simulation image is selected.

Next, joint angles of fingers used for the generation of the selected two-dimensional simulation image are obtained. Next, the angles of the joints of the fingers are applied to the palm image of FIG. 1D. Thus, as illustrated in FIG. 1E, it is possible to correct the captured image so that the joint angles of the fingers of the palm image are consistent with joint angles of the fingers during making an enrolled data. With the processes, it is possible to adjust joint angles of fingers of a palm image obtained during an authentication process to joint angles of the fingers obtained during making an enrolled data. Therefore, the authentication accuracy can be improved.

Figure 2A:
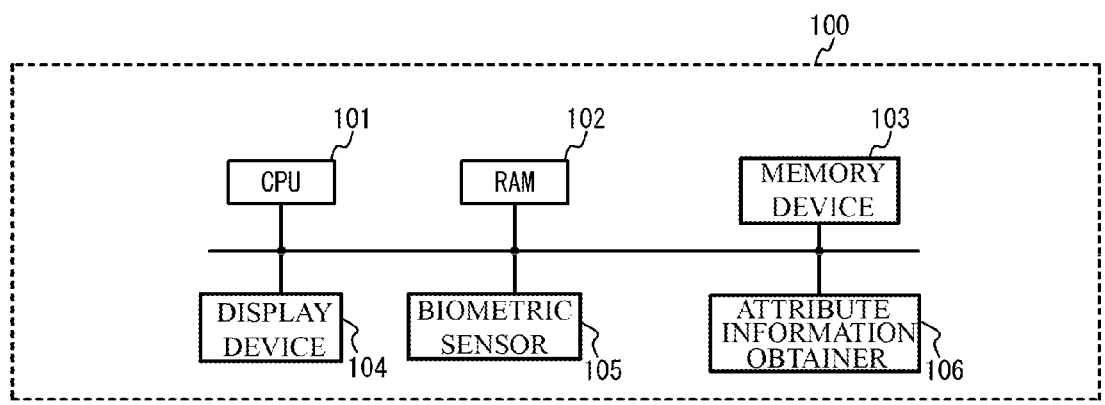
FIG. 2A illustrates a block diagram for describing a hardware structure of a biometric authentication device in accordance with a first embodiment.
Figure 2B:
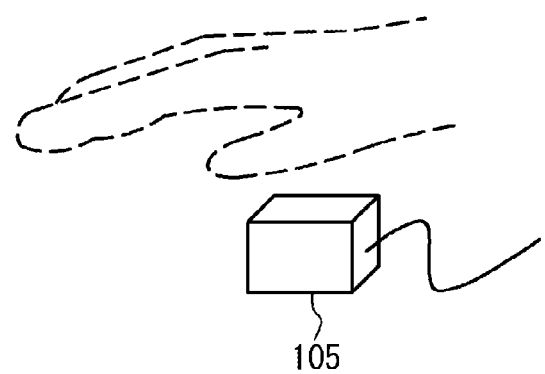
FIG. 2B illustrates a schematic view of a biometric sensor.

A description will be given of a concrete structure of a biometric authentication device in accordance with a first embodiment. FIG. 2A illustrates a block diagram for describing a hardware structure of a biometric authentication device 100 in accordance with the first embodiment. FIG. 2B illustrates a schematic view of a biometric sensor 105 described later. As illustrated in FIG. 2A, the biometric authentication device 100 has a CPU 101, a RAM (Random Access Memory) 102, a memory device 103, a display device 104, the biometric sensor 105, an attribute information obtainer 106 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric authentication program. The display device 104 is a liquid crystal display, an electro luminescence panel or the like and displays a result of a process of the biometric authentication device 100.

The biometric sensor 105 is a sensor to obtain a biometric image of a user. The biometric sensor 105 may be a non-contact type sensor that obtains a biometric image without contacting. In the embodiment, the biometric sensor 105 is a sensor to obtain a palm image without contacting and is, for example, a CMOS (Complementary Metal Oxide Semiconductor) camera or the like. For example, the biometric sensor 105 captures a palm image including a vein pattern with use of a near-infrared light. The attribute information obtainer 106 is an inputting component such as a keyboard, a mouse and so on. For example, the attribute information obtainer 106 is a device for inputting an ID or the like for identifying a user.

A biometric authentication program stored in the memory device 103 is developed to the RAM 102. The CPU 101 executes the biometric authentication program developed to the RAM 102. Thus, each part of FIG. 3 is achieved. FIG. 3 illustrates a functional block of the biometric authentication device 100. As illustrated in FIG. 3, the biometric authentication device 100 acts as a biometric feature extractor 10, a biometric feature database 20, a model data storage 30, a model data comparator 40, a correction processor 50, a comparator 60 and an output portion 70.

A description will be given of an enrollment process and a comparing process performed by the biometric authentication device 100.

[Enrollment Process]

Figure 4:
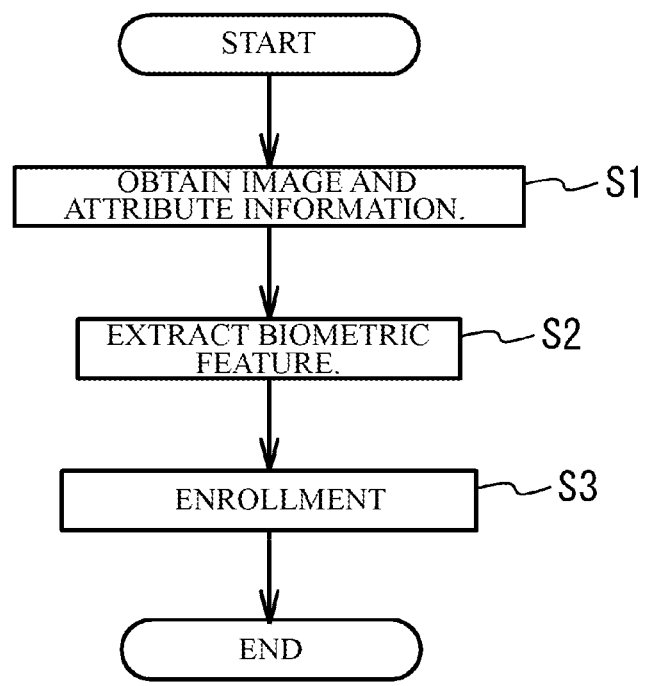
FIG. 4 illustrates a flowchart of an example of an enrollment process.

FIG. 4 illustrates a flowchart of an example of an enrollment process. As illustrated in FIG. 4, the attribute information obtainer 106 obtains attribute information of a user. And, the biometric feature extractor 10 obtains a palm image of the user from the biometric sensor 105 as an enrollment biometric image (Step S1). In this case, when a guide or the like is used, a joint angle of each finger of the palm of the user becomes a predetermined value. The joint angle of each finger in this case is hereinafter referred to as a reference joint angle.

Next, the biometric feature extractor 10 extracts a vein pattern from the enrolled biometric image as a biometric feature (Step S2). Next, the biometric feature database 20 relates the attribute information obtained by the attribute information obtainer 106 with a biometric feature extracted by the biometric feature extractor 10 and stores the attribute information and the biometric feature (Step S3). With the processes, an enrolled biometric image of each user can be enrolled.

[Comparing Process]

Figure 5:
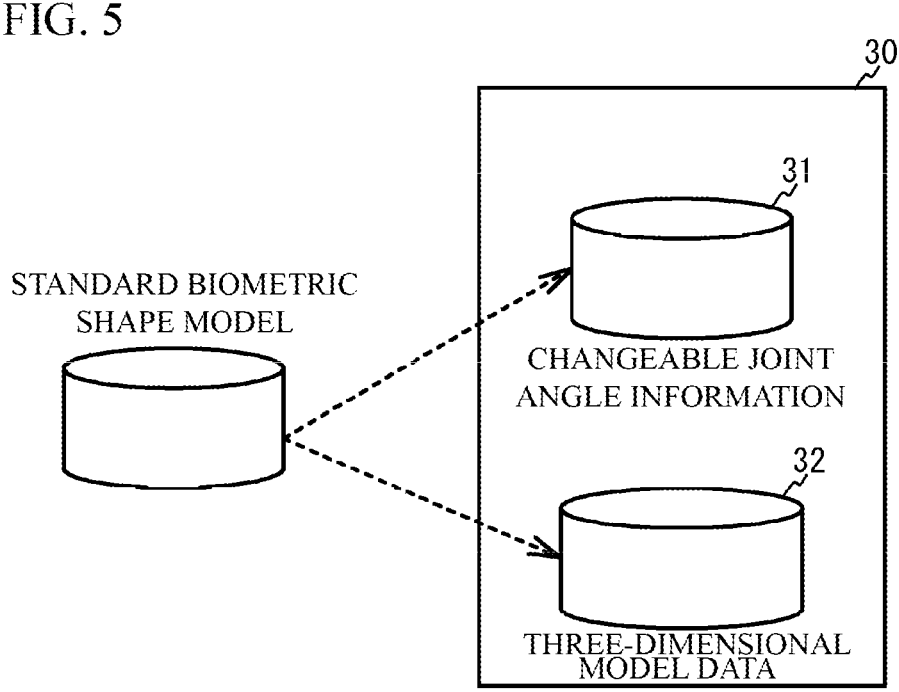
FIG. 5 illustrates each function of a model data storage.

Next, a description will be given of a comparing process. FIG. 5 illustrates each function of the model data storage 30. As illustrated in FIG. 5, the model data storage 30 acts as a storage 31 to store changeable angle information of joint and a storage 32 to store three dimensional model data. The storage 31 to store changeable angle information of joint stores changeable angle information of joint. The changeable angle information of joint is information expressing movement of each joint of a biometric instance that is a comparing object. The changeable angle information of joint is 0 degree to 90 degrees or the like.

The storage 32 to store three dimensional model data stores a three dimensional model data. The three dimensional model data is a model data in which a biometric instance is expressed by three dimensions. The changeable angle information of joint and the three dimensional model data can be extracted as a value data from abstract shape models of a biometric instance of a standard human that is extracted from many humans in advance. In the embodiment, the storage 32 to store three dimensional model data stores a three dimensional model data for simulating a shape of a palm.

This operation corresponds to an operation that is generally called "modeling" in the art of three dimensional CG technology. The operation is an operation in which a user for generating a data refers to a standard biometric shape model, digitalizes information such as arrangements of joints forming a biometric instance, an aspect of a skin, deformation of the skin according to bending of the joints or the like, and generates a single three-dimensional model data of the biometric shape. A tool for the operation is called a three-dimensional modeler. There are various tools.

The operation performed by manpower is normal at the present in a field of three-dimensional computer graphics (CG). However, it is possible to semi-automatically generate the three-dimensional model data by using a special imaging device that obtains convex-concavo information of imaging object during imaging and combining captured images. In the embodiment, any method can be used as a method of making the shape of the biometric instance utilizable as a three-dimensional model data. When two-dimensional simulation images of a biometric instance can be generated with use of joint angle information and a three-dimensional model data, any method can be used.

It is not necessary to simulate bones of an actual biometric instance without change in order to generate the three-dimensional model data. The number of joints may be reduced to a number needed for simulating movement of a skin in order to simplify latter processes. In this case, the processes become efficient.

Figure 6:
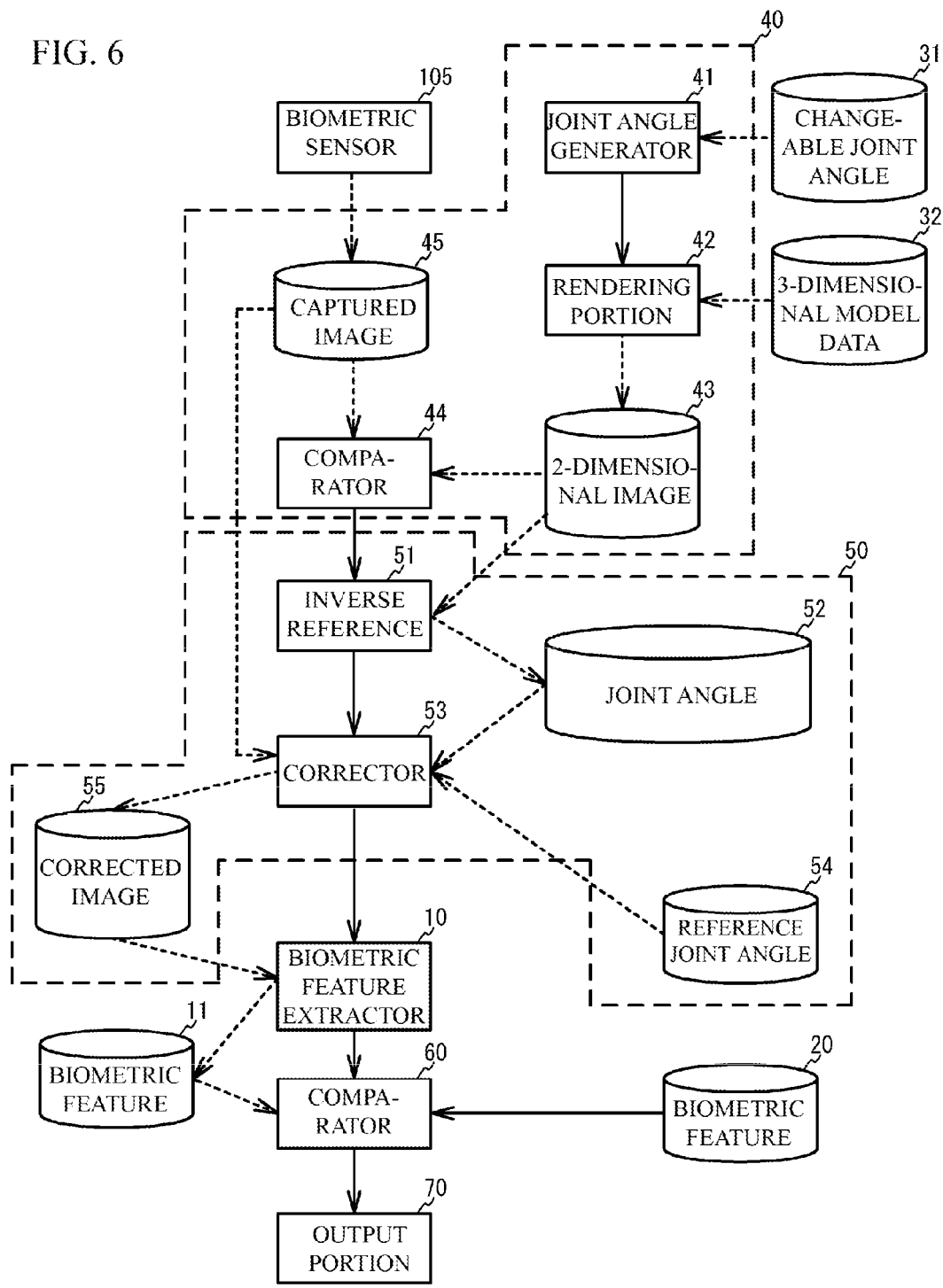
FIG. 6 illustrates details of each function of a biometric authentication device.

FIG. 6 illustrates details of each function of the biometric authentication device 100. As illustrated in FIG. 6, the model data comparator 40 acts as a joint angle generator 41, a rendering portion 42, a two-dimensional image storage 43, a comparator 44 and a captured image storage 45. The correction processer 50 acts as an inverse reference portion 51, a joint angle storage 52, a corrector 53, a reference joint angle storage 54 and a corrected image storage 55.

The joint angle generator 41 gets changeable angle information of joint from the storage 31 to store changeable angle information of joint and generates combination information of joint angles in which each joint angle is slightly changed based on a step angle determined in advance. For example, all joint angles in a case where each joint angle is slightly changed are generated as a combination of a first to N-th. FIG. 7 illustrates a table of each generated combination information.

An identical value may be used for all joints as a step angle. Alternately, the step angle may be changed with respect to at least two joints, because movements of joints are slightly different from each other and deformations of skins of a biometric instance during movement of each joint are different from each other. For example, in a case of a palm, even if an angle of a thumb is slightly changed, a skin of a palm is greatly pulled and greatly moves in accordance with the movement of the thumb. However, an influence of other fingers other than the thumb (from a forefinger to a little finger) on the skin is smaller than the influence of the thumb. For example, when the thumb moves by five degrees, a large area of the skin of the palm greatly moves. However, even if the fingers other than the thumb moves by five degrees, the skin of the palm does not greatly moves compared to the case of the thumb. And so, it is preferable that the step angle is small and the angle changing can be finely set, because the importance of the thumb is large. It is possible to achieve efficiency by reducing the number of combinations of joint angles when the step angle is large and the angle is changed roughly.

As illustrated in FIG. 6, the rendering portion 42 generates a two-dimensional simulation image of a biometric instance with use of a three-dimensional CG technology based on the three-dimensional model data stored in the storage 32 to store three-dimensional model data. In concrete, the rendering portion 42 generates a two simulation images under a condition that a skin of the three-dimensional model data is deformed, with respect to each combination of joint angles generated by the joint angle generator 41. In this manner, the operation for generating two-dimensional simulation images based on deformations of a three-dimensional model data and joints of the model data is called a three-dimensional image rendering. The two-dimensional image storage 43 stores the two-dimensional simulation images generated by the rendering portion 42 together with a combination of joint angles used during the generation of each two-dimensional simulation image. FIG. 8A illustrates an example of a three-dimensional model data. FIG. 8B illustrates an example of two-dimensional simulation images of combinations of joint angles, that are generated by the rendering portion 42.

The comparator 44 compares the two-dimensional simulation images stored by the two-dimensional image storage 43 with a palm image captured by the biometric sensor 105 during the authentication process. The palm image can be obtained by the captured image storage 45 that temporarily stores the palm image captured by the biometric sensor 105. FIG. 8C illustrates an example of the palm image. An object with which the comparator 44 compares is not a biometric feature data that is used for an individual authentication and identifying a person but information for comparing a difference between shape of biometric instances. For example, contrasting density information can be used. Outline information (shape of palm) may be used. When the contrasting density information or the outline information is used, a comparing can be performed with a simple process. In the embodiment, the contrasting density information is used as an example.

The comparator 44 roughly adjusts a position of the palm image to a position of a biometric instance captured in the two-dimensional simulation images by a parallel movement, a rotation movement, an enlargement or reduction. After that, the comparator 44 calculates a similarity between parts of the biometric instances captured in the images based on the contrasting density, and digitalizes the similarity as a score. The comparator 44 repeats comparing between all two-dimensional simulation images generated with respect to each combination of joint angle and the palm image and selects one of the two-dimensional simulation images of which similarity of contrasting density is the highest.

The inverse reference portion 51 obtains a combination of joint angles used during the generation of the two-dimensional simulation image selected by the comparator 44 from the two-dimensional image storage 43. The joint angle storage 52 stores the combination of joint angles obtained by the inverse reference portion 51. Next, the corrector 53 obtains the palm image from the captured image storage 45, and corrects the palm image based on the combination of joint angles stored by the joint angle storage 52. In concrete, the corrector 53 identifies the position of each joint of the pal image as well as the case where the position of the two-dimensional simulation image is adjusted. Next, the corrector 53 obtains the reference joint angle from the reference joint angle storage 54. Next, the corrector 53 corrects the palm image so that the joint angles obtained based on the position of each identified joint angle are consistent with the reference joint angles. The corrected palm image (hereinafter referred to as a corrected image) is stored by the corrected image storage 55. FIG. 8D illustrates an example of a corrected image.

Next, the biometric feature extractor 10 extracts a vein pattern from the corrected image as a biometric feature. The extracted biometric feature is stored by a biometric feature storage 11. FIG. 8E illustrates an extracted vein pattern. Next, the comparator 60 compares the vein pattern stored in the biometric feature storage 11 with a biometric feature of each enrolled biometric image enrolled in the biometric feature database 20. Here, when a user inputs an ID or the like into the attribute information obtainer 106, it is possible to identify the biometric feature of the enrolled biometric image that is an object of authentication. FIG. 8F illustrates an example of an enrolled biometric feature. In concrete, the comparator 60 calculates a similarity between the biometric feature stored by the biometric feature storage 11 and the biometric feature of the enrolled biometric image enrolled in the biometric feature database 20, and determines whether the similarity is equal to or more than a threshold. When the similarity is equal to or more than the threshold, the output portion 70 outputs information of success of the comparing.

Only one of the two-dimensional simulation image of which similarity of contrasting density comparing is the highest is not selected, but the similarities are ranked and the similarities may be subjected to the following processes in order of high similarities. For example, based on the two-dimensional simulation image of which similarity is the highest, when the comparing of the comparator 60 is failed, the processes may be performed based on the two-dimensional simulation image of which similarity is the second highest. In this manner, the process may be repeated in order of the similarities until the comparing of the biometric features is succeeded.

Figure 9:
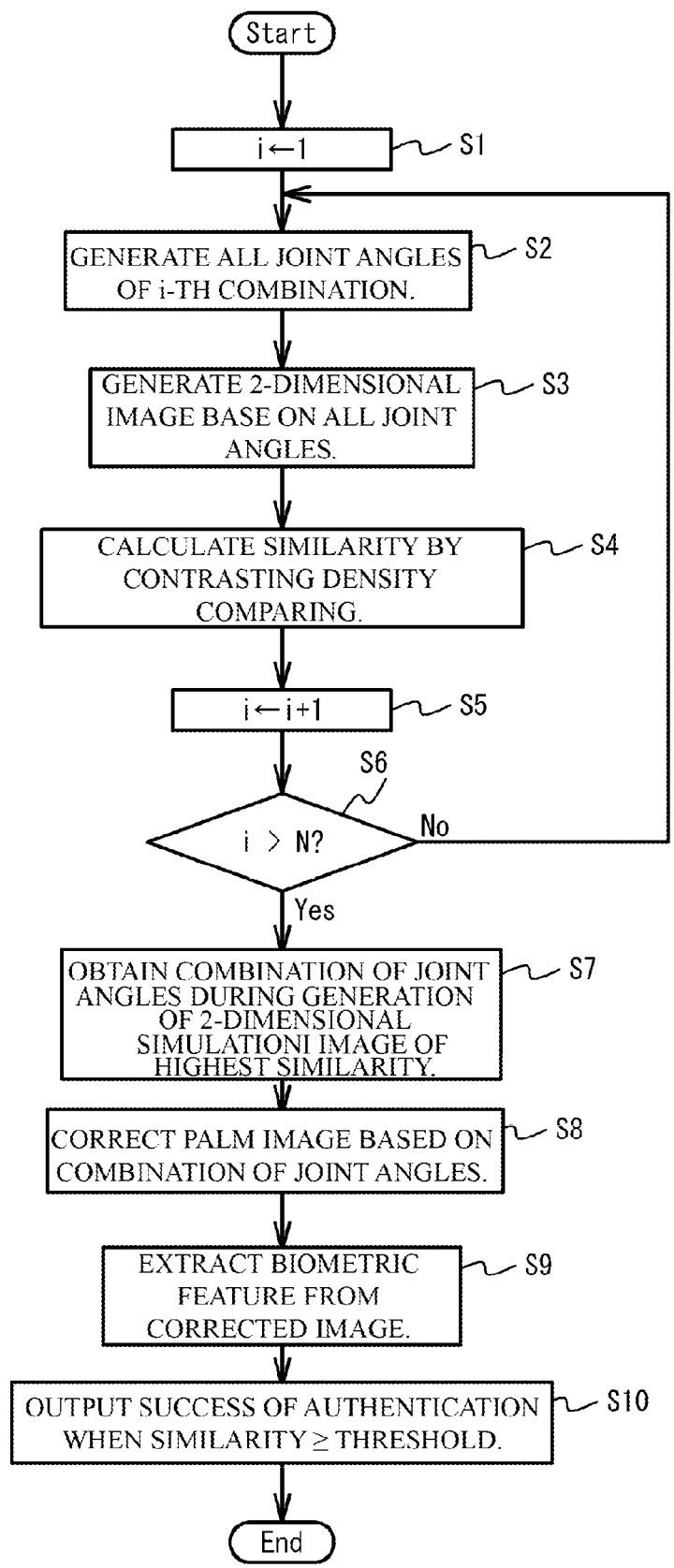
FIG. 9 illustrates a flowchart of a first embodiment.

FIG. 9 illustrates a flowchart of the above-mentioned processes. As illustrated in FIG. 9, the joint angle generator 41 assigns 1 into a parameter i (Step S1). Next, the joint angle generator 41 generates all joint angles of i-th combination (Step S2). Next, the rendering portion 42 generates two-dimensional simulations images based on the all joint angles generated in Step 51 and stores the two-dimensional simulation images in the two-dimensional image storage 43 (Step S3). Next, the comparator 44 calculates a similarity between the two-dimensional simulation images stored in the two-dimensional image storage 43 and a palm image captured by the biometric sensor 105 during the authentication process by the contrasting density comparing (Step S4).

Next, the joint angle generator 41 adds 1 to the parameter i (Step S5). Next, the joint angle generator 41 determines whether the parameter i exceeds the number N of the combinations (Step S6). When it is not determined that the parameter i exceeds N, Step S2 is executed again.

When it is determined that the parameter i exceeds N in Step S6, the comparator 44 selects a two-dimensional simulation image of which similarity of contrasting density comparing is the highest. The inverse reference portion 51 inversely obtains a combination of joint angles used for the generation of the two-dimensional simulation image selected by the comparator 44 from the joint angle generator 41 and stores the combination of the joint angles in the joint angle storage 52 (Step S7).

Next, the corrector 53 obtains the palm image from the captured image storage 45 and corrects the palm image based on the combination of joint angles stored by the joint angle storage 52 (Step S8). The corrected image storage 55 stores the corrected image. Next, the biometric feature extractor 10 extracts a vein pattern as a biometric feature from the corrected image (Step S9). The biometric feature storage 11 stores the extracted biometric feature. Next, the comparator 60 compares the biometric feature stored by the biometric feature storage 11 with a biometric feature of an enrolled biometric image enrolled in the biometric feature database 20. When a similarity of the comparing is equal to or more than a threshold, the output portion 70 outputs information of success of the comparing (Step S10).

In the embodiment, it is possible to adjust the joint angles of the fingers of the palm image obtained during the authentication process to the joint angles of the fingers during obtaining the enrolled biometric image. Thus, it is possible to make correspondence between the shape of the palm during the enrollment process and the shape of the palm during the authentication process. Therefore, the authentication can be performed with high accuracy. In the embodiment, the joint angles of the fingers of the palm image captured during the authentication process can be adjusted to the joint angles of the fingers during obtaining the enrolled biometric feature image. However, the structure is not limited. For example, when the joint angles of the fingers of the palm image obtained during the authentication process get closer to the joint angles of the fingers during obtaining the enrolled biometric image, the authentication accuracy can be improved.

Second Embodiment

In the first embodiment, the standard biometric shape model is used. However, joint information or three-dimensional information may be extracted from biometric shape of a user himself or herself and the information may be used as the three-dimensional model data. In a second embodiment, a description will be given of an example in which joint information or three-dimensional shape information extracted from a biometric shape of a user when enrolling an enrolled biometric image is used as a three-dimensional model data.

Figure 10:
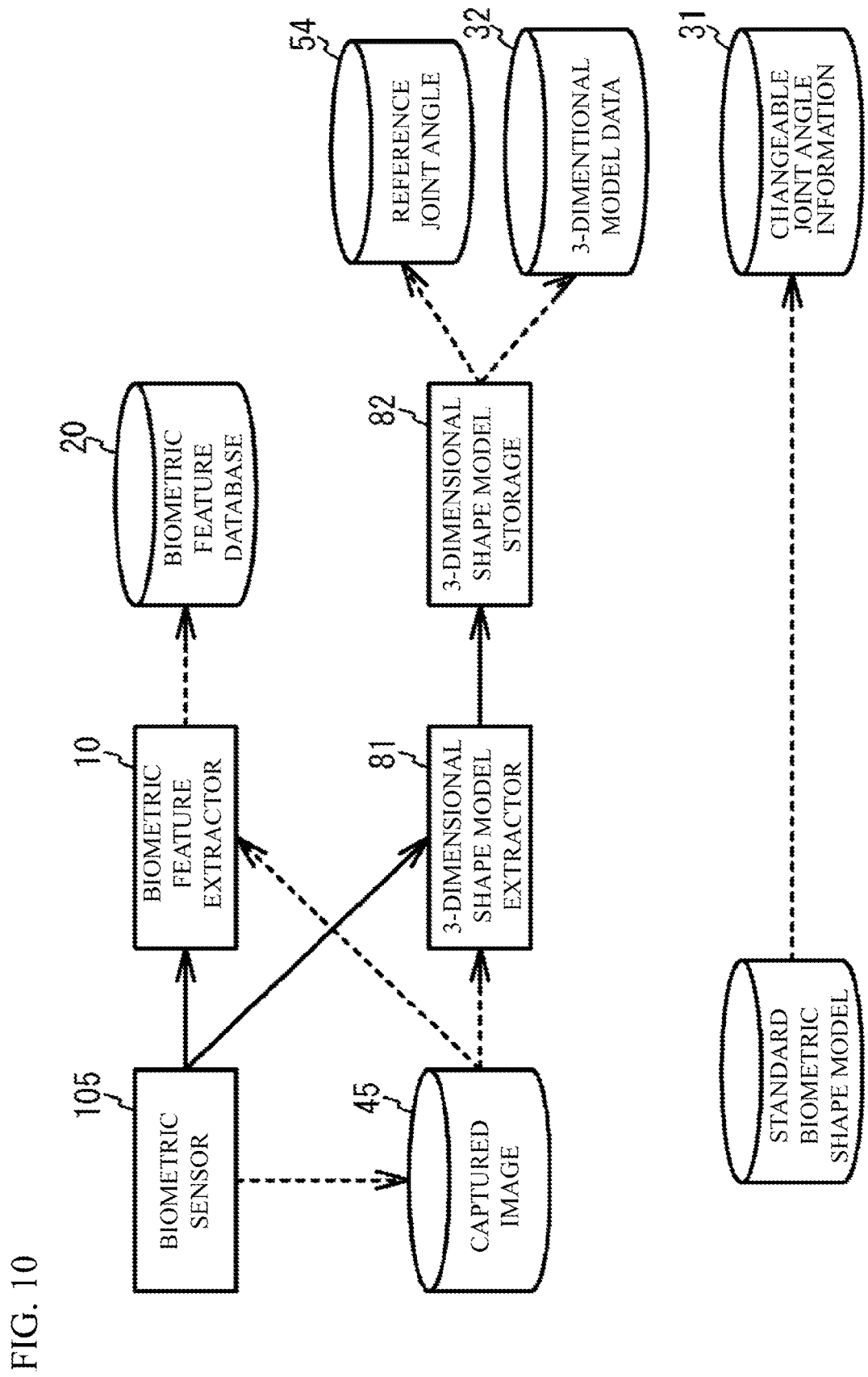
FIG. 10 illustrates a block diagram of each function of a second embodiment.

FIG. 10 illustrates a block diagram for describing each function in a case where the reference joint angle storage 54, the storage 32 to store three dimensional model data and the storage 31 to store changeable angle information of joint store information. As well as the first embodiment, the storage 31 to store changeable angle information of joint stores a value data of the changeable angle information of joint extracted from the abstract shape model of a biometric body of a standard human obtained by sampling many humans in advance.

A three-dimensional shape model extractor 81 extracts a three-dimensional model data for simulating a palm shape from a palm image captured by the biometric sensor 105 by a method such as the above-mentioned modeling. In this case, when a guide or the like is used, a joint angle of each finger of a palm of a user becomes a predetermined value. A storage 82 to store three-dimensional shape model makes the reference joint angle storage 54 store a joint angle of each finger. And, the storage 82 to store three-dimensional shape model makes the storage 32 to store three dimensional data store the three-dimensional model data.

The changeable angle information of joint may also be extracted from a palm shape. Alternately, a user may input changeable joint angles as values. Storage place of the changeable angle information of joint, reference joint angles and the three-dimensional model is not limited when the changeable angle information, the reference joint angles and the three-dimensional model data are linked to the user. The changeable angle information, the reference joint angles and the three-dimensional model data may be separately stored from the biometric feature of the enrolled biometric image or stored in the biometric feature database 20. The comparing process is the same except for changing the three-dimensional model data that is used by the user. After the user is identified by inputting a user ID, it is possible to perform the comparing process with use of the three-dimensional model data of the user.

In the embodiment, it is not necessary to use the standard biometric shape model. Therefore, the process can be simplified. And, storage capacity can be reduced.

Third Embodiment

In the first embodiment, the palm image is corrected so that joint angles of fingers of the palm image captured by the biometric sensor 105 during the authentication process are consistent to the reference joint angles. However, joint angles of fingers of the enrolled biometric image may be corrected. In a third embodiment, a description will be given of an example in which the joint angles of fingers of the enrolled biometric image are corrected.

Figure 11:
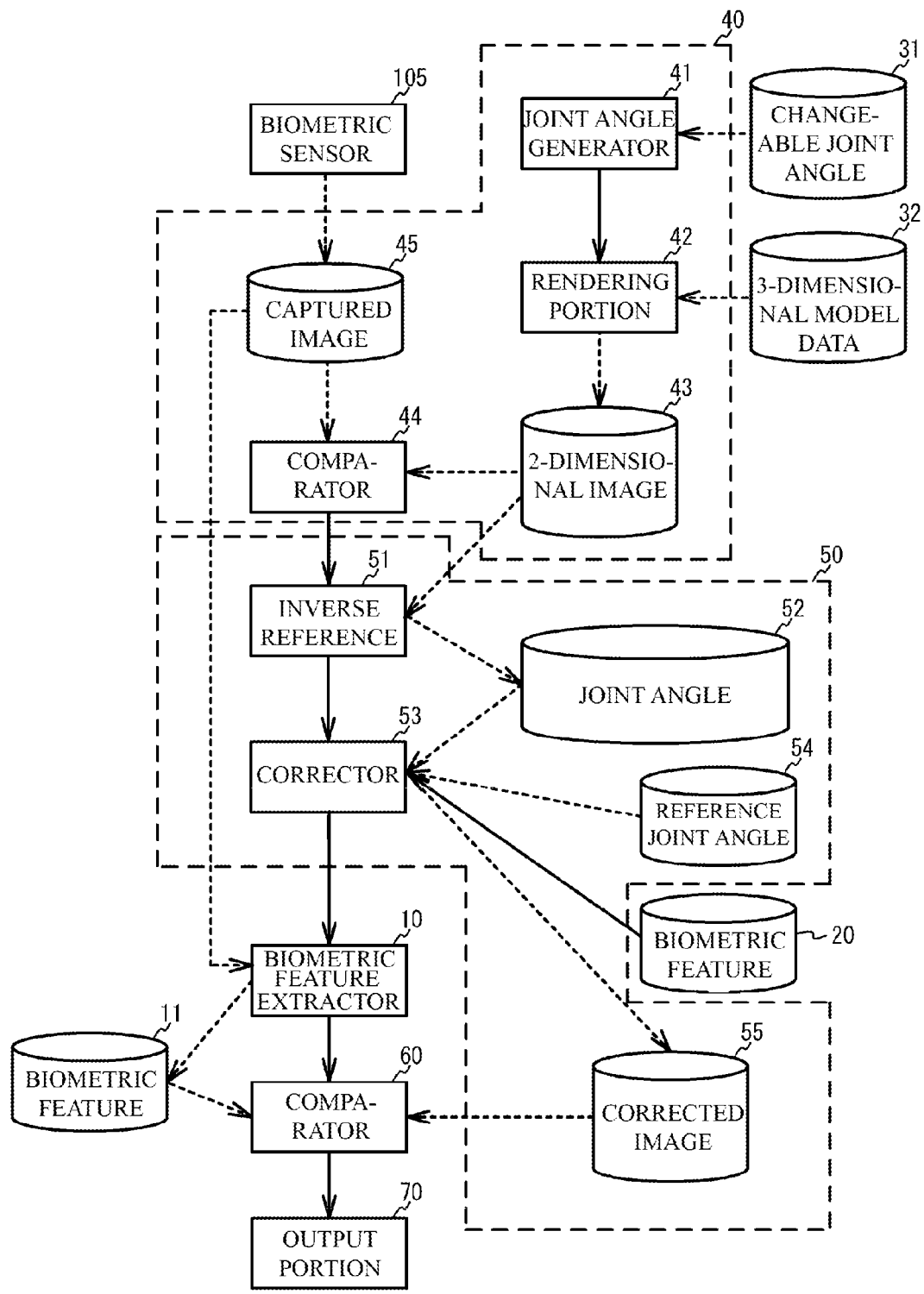
FIG. 11 illustrates details of each function of a biometric authentication device in a second embodiment.
Figure 12A:
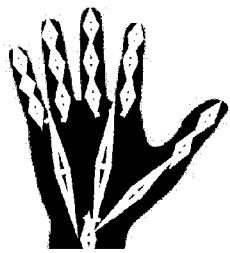
FIG. 12A illustrates an example of a three-dimensional model data.
Figure 12B:
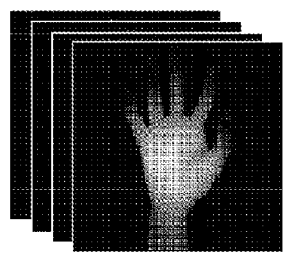
FIG. 12B illustrates an example of two-dimensional simulation images of combinations of joint angles.
Figure 12C:
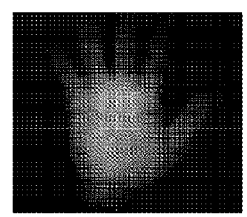
FIG. 12C illustrates an example of a palm image.

FIG. 11 illustrates details of each function of the biometric authentication device 100 in the embodiment. The same processes as the first embodiment are performed until the joint angle storage 52 stores the combinations of joint angles obtained by the inverse reference portion 51. FIG. 12A illustrates a three-dimensional model data. FIG. 12B illustrates a two-dimensional simulation image of every combination of the joint angles generated by the rendering portion 42. FIG. 12C illustrates a palm image.

Figure 12D:
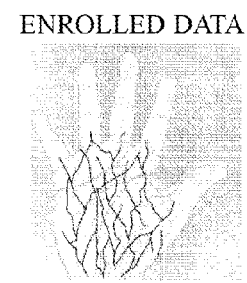
FIG. 12D illustrates a biometric feature of an identified enrolled biometric feature.

Next, the corrector 53 obtains a biometric feature of the enrolled biometric image from the biometric feature database 20. And the corrector 53 corrects the biometric feature based on the combinations of the joint angles stored by the joint angle storage 52. When an ID is input to the attribute information obtainer 106 by a user, the biometric feature of the enrolled biometric image of comparing object can be identified. FIG. 12D illustrates the biometric feature of the identified enrolled biometric feature.

Figure 12E:
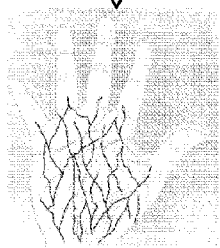
FIG. 12E illustrates a corrected biometric feature.

The corrector 53 obtains the reference joint angles from the reference joint angle storage 54. Next, the corrector 53 corrects the biometric feature of the enrolled biometric image so that a difference between the reference joint angles and the joint angles stored by the joint angle storage 52 becomes zero. The corrected biometric feature is stored by the corrected image storage 55. FIG. 12E illustrates the corrected biometric feature.

Figure 12F:
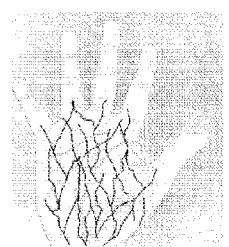
FIG. 12F illustrates an example of an extracted biometric feature.

Next, the biometric feature extractor 10 extracts a vein pattern as a biometric feature from the palm image stored by the captured image storage 45. FIG. 12F illustrates an example of an extracted biometric feature. The biometric feature storage 11 stores the extracted biometric feature. Next, the comparator 60 compares the vein pattern stored by the biometric feature storage 11 with the corrected biometric feature. In concrete, the comparator 60 calculates a similarity between the biometric feature stored by the biometric feature storage 11 and the corrected biometric feature and determines whether the similarity is equal to or more than a threshold. When the similarity is equal to or more than the threshold, the output portion 70 outputs information of success of comparing.

Figure 13:
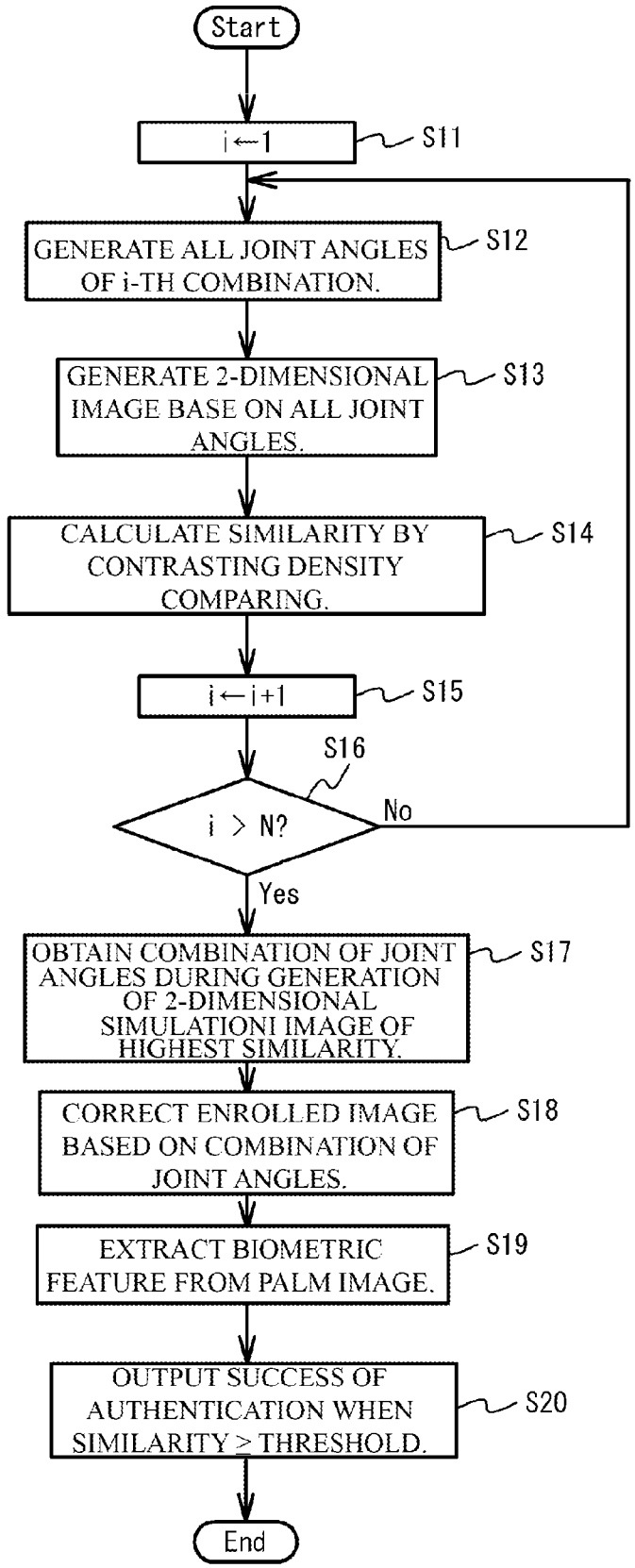
FIG. 13 illustrates a flowchart of a second embodiment.

FIG. 13 illustrates a flowchart of the above-mentioned processes. Step S11 to Step S17 are the same as Step 51 to Step S7 of FIG. 9. After execution of Step S17, the corrector 53 obtains the biometric feature of the enrolled biometric image from the biometric feature database 20 and corrects the biometric feature based on the combination of the joint angles stored by the joint angle storage 52 (Step S18). The corrected image storage 55 stores the corrected biometric feature. Next, the biometric feature extractor 10 extracts a vein pattern as a biometric feature from the palm image stored by the captured image storage 45 (Step S19). The biometric feature storage 11 stores the extracted biometric feature. Next, the comparator 60 compares the biometric feature stored by the biometric feature storage 11 with the corrected biometric feature. When a similarity of the comparing is equal to or more than a threshold, the output portion 70 outputs information of success of comparing (Step S20).

In the embodiment, it is possible to adjust the joint angles of the fingers during obtaining the enrolled biometric image to the joint angles of the fingers of the palm image obtained during the authentication process. Thus, it is possible to make correspondence between the shape of the palm during the enrolling process and the shape of the palm during the authentication process. Therefore, the authentication can be performed with high accuracy. In the embodiment, the joint angles of the fingers during obtaining the enrolled biometric feature image can be adjusted to the joint angles of the fingers of the palm image captured during the authentication process. However, the structure is not limited. For example, when the joint angles of the fingers during obtaining the enrolled biometric image get closer to the joint angles of the fingers of the palm image obtained during the authentication process, the authentication accuracy can be improved.

In the above-mentioned embodiments, the palm is used as the biometric instance. However, the biometric instance is not limited to a palm. A biometric instance in which a shape is changed according to a bending angle of a joint can be used as an object of the above-mentioned embodiments. For example, a finger is used as a biometric instance, and a fingerprint or a finger vein can be used as a biometric instance.

In the above-mentioned embodiments, an enrolled biometric image that is an object of comparing is identified by inputting an ID or the like. However, the structure is not limited. For example, in the first embodiment, a biometric feature extracted from a corrected image may be compared with a biometric feature of enrolled biometric images of all users. In the third embodiment, biometric features of enrolled biometric images of all users may be corrected, and each biometric feature may be compares with a biometric feature extracted from a palm image. In these cases, when the highest similarity is equal to or more than a threshold, a user who is an object of comparing is consistent with a user of the enrolled biometric image. Thus, the comparing is succeeded.

In the above-mentioned embodiment, the storage 32 to store three-dimensional model data acts as a storage configured to store a plurality of model images generated by changing a bending angle of a joint of a biometric model and correction information of each of the plurality of model images. The combinations of joint angles related to each model image corresponds to an example of correction information of each model image. The biometric sensor 105 acts as a biometric sensor configured to capture a biometric image that is an object of comparing. The comparator 44 acts as a comparator configured to determine similarities between the biometric image captured by the biometric sensor and the plurality of model images. The comparator 44 also acts as a selector configured to select a model image based on the similarities. The inverse reference portion 51 acts as a reader configured to read correction information corresponding to the model image that is selected, from the storage. The corrector 53 acts as a corrector configured to correct one of the biometric image captured by the biometric sensor or the enrolled biometric image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device performing an authentication based on a similarity between a biometric image that is an object of comparing and an enrolled biometric image, comprising:
   a storage configured to store a plurality of model images generated by changing a bending angle of a joint of a biometric model and correction information of each of the plurality of model images;
   a biometric sensor configured to capture a biometric image that is an object of comparing;
   and a processor configured to execute a process, the process comprising:

determining similarities between the biometric image captured by the biometric sensor and the plurality of model images;

selecting a model image based on the similarities;

reading correction information corresponding to the model image that is selected, from the storage; and correcting one of the biometric image captured by the biometric sensor or the enrolled biometric image based on the correction information.

2. The biometric authentication device as claimed in claim 1, wherein a biometric instance used for the comparing is a palm of a human.

3. The biometric authentication device as claimed in claim 1, wherein, in the determining, the similarities are determined based on the biometric image captured by the biometric sensor and a contrasting density of the plurality of model images.

4. The biometric authentication device as claimed in claim 1, wherein, in the determining, the similarities are determined based on a shape of a palm and a shape of a model.

5. The biometric authentication device as claimed in claim 1, wherein the biometric model is a biometric instance from which the enrolled biometric image is obtained.

6. The biometric authentication device as claimed in claim 1, wherein:

the plurality of model images are generated by changing the bending angle of joints of the biometric model with a predetermined step value; and the step values of at least two of the joints are different from each other.

7. A biometric authentication method performing an authentication based on a similarity between a biometric image that is an object of comparing and an enrolled biometric image, comprising:

storing a plurality of model images generated by changing a bending angle of a joint of a biometric model and correction information of each of the plurality of model images in a storage;

capturing a biometric image that is an object of comparing with a biometric sensor;

determining similarities between the biometric image captured by the biometric sensor and the plurality of model images;

selecting a model image based on the similarities;

reading correction information corresponding to the model image that is selected, from the storage; and correcting one of the biometric image captured by the biometric sensor or the enrolled biometric image based on the correction information.

8. The biometric authentication method as claimed in claim 7, wherein a biometric instance used for the comparing is a palm of a human.

9. The biometric authentication method as claimed in claim 7, wherein, in the determining, the similarities are determined based on the biometric image captured by the biometric sensor and a contrasting density of the plurality of model images.

10. The biometric authentication method as claimed in claim 7, wherein, in the determining, the similarities are determined based on a shape of a palm and a shape of a model.

11. The biometric authentication method as claimed in claim 7, wherein the biometric model is a biometric instance from which the enrolled biometric image is obtained.

12. The biometric authentication method as claimed in claim 7, wherein:

the plurality of model images are generated by changing the bending angle of joints of the biometric model with a predetermined step value; and the step values of at least two of the joints are different from each other.

13. A computer readable, non-transitory medium storing a program that causes a computer to execute a process, the process comprising:

storing a plurality of model images generated by changing a bending angle of a joint of a biometric model and correction information of each of the plurality of model images in a storage;

capturing a biometric image that is an object of comparing with a biometric sensor;

determining similarities between the biometric image captured by the biometric sensor and the plurality of model images;

selecting a model image based on the similarities;

reading correction information corresponding to the model image that is selected, from the storage; and correcting one of the biometric image captured by the biometric sensor or an enrolled biometric image based on the correction information.

14. The medium as claimed in claim 13, wherein a biometric instance used for the comparing is a palm of a human.

15. The medium as claimed in claim 13, wherein, in the determining, the similarities are determined based on the biometric image captured by the biometric sensor and a contrasting density of the plurality of model images.

16. The medium as claimed in claim 13, wherein, in the determining, the similarities are determined based on a shape of a palm and a shape of a model.

17. The medium as claimed in claim 13, wherein the biometric model is a biometric instance from which the enrolled biometric image is obtained.

18. The medium as claimed in claim 13, wherein:

the plurality of model images are generated by changing the bending angle of joints of the biometric model with a predetermined step value; and the step values of at least two of the joints are different from each other.

* * * * *